E. M. Long,
Casting Solder.

Nº 58,728.            Patented Oct. 9, 1866.

Witnesses.
William H. Clifford
Henry C. Houston.

Inventor:
Edward M. Long

UNITED STATES PATENT OFFICE.

E. M. LANG, OF PORTLAND, MAINE, ASSIGNOR TO HIMSELF AND ISAIAH GILMAN.

IMPROVED SOLDER-CASTING MACHINE.

Specification forming part of Letters Patent No. 58,728, dated October 9, 1866.

*To all whom it may concern:*

Be it known that I, E. M. LANG, of Portland, in the county of Cumberland and State of Maine, have invented a new and Improved Solder-Casting Machine; and I hereby declare the following to be a full, clear, and exact description thereof, which will enable others skilled in the art to which it appertains to make and use my invention, reference being had to the accompanying drawings, forming part of this specification, in which—

Figure 3:
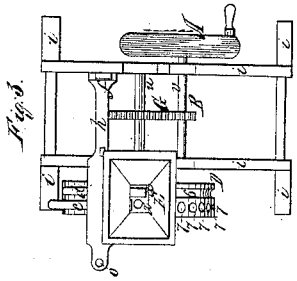
Figures 1, 4:
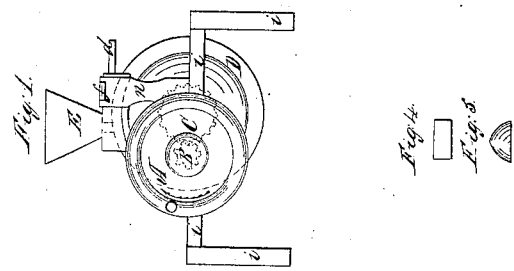
Figure 5:
Figure 2:
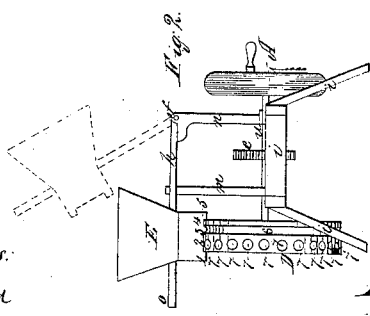

Figure 1 shows a side elevation of my machine; Fig. 2, an end elevation of the same; Fig. 3, a top view, in perspective, of the same; Fig. 4, a view of a solder-drop of the common form; Fig. 5, the same, as cast in my invention.

The same letters indicate like parts in all the figures.

In soldering cans such as are used for the packing and preservation of meats and vegetables of almost every kind, drops or small pieces of solder have been found the most convenient. Experience has also proved that the form most convenient for these drops, when used for such a purpose, is that of a semi-spherical shape, such as shown in Fig. 5.

It has heretofore been the practice to cast the solder intended for this use into bars, and then to cut it into sections, such as shown in Fig. 4. Large quantities of solder in this form are used in establishments where meats and vegetables are hermetically packed, and it is one object of my invention to provide a means for casting these drops in the most speedy manner and of the most economical and convenient shape; again, it is highly desirable, where the solder is cast in the form of bars, that it should be of a uniform and unvaried shape, size, and thickness. My invention also seeks to attain this result.

My invention consists, first, in the combination and arrangement, hereinafter described, of the wheel A, geared wheels B and C, and circular mold D; second, the combination of the receptacle E, slides $c$ $d$, bar $h$, and joint $f$.

More particular description and reference to the drawings will illustrate clearly the nature of my invention.

The operating portions of my machine are set and arranged on the frame $i$. The wheel A, turned by a crank, moves the geared wheel B, which works into the geared wheel C. These wheels turn upon the axes $u$ and $v$, respectively attached to the frame, as illustrated in the drawings. The circular mold D is rigidly attached to the shaft $u$. Thus, by turning the wheel A, revolution is imparted to the mold D.

$m$ $n$ show two uprights attached to the horizontal portions of the frame $i$. To the upright $n$ is connected the arm $h$ by the joint or hinge $f$, and the arm $h$ rests upon the top of the upright $m$ by means of a slot and shoulder, as illustrated in Figs. 2 and 3. By means of the joint $f$ the receptacle E can be lifted from the circular mold D, as indicated by the dotted lines in Fig. 2, the receptacle E being rigidly attached to the arm or bar $h$, and being more firmly held in position when placed over the mold by the shoulder on the upright $n$ and the slot in the bar $h$. The lower part of the receptacle E is fitted exactly to the periphery of the mold D, as shown at 1 2 3 4 5, Fig. 2.

The mold D has the channel 6 and the matrices 7, the channel being for casting bars of solder, and the matrices for the drops, such as shown in Fig. 5. The receptacle E is furnished with the sliding stops $c$ and $d$, Fig. 3.

At $o$ may be attached a weight to press the receptacle E more firmly upon the mold D. The balance-wheel A is turned in the direction of the arrows. The receptacle E being kept in a heated state, the solder, in a liquid or melted condition, is placed therein, and accordingly as it is desired to cast the same in the form of bars or drops, the slide $c$ or $d$ is withdrawn from one of the apertures $x$ $x$. Revolution is then imparted to the mold D in the manner heretofore described, and the metal allowed to enter and assume the form of the channel 6 or the matrices 7. Continuous bars or separate drops of solder may be thus quickly and conveniently cast.

It is essential that the receptacle E be kept heated during the process thus described, and to this end the receptacle may be surrounded by a cylinder or box, and heat thus imparted to the same by any convenient and proper means.

The metal is cooled by its contact with the mold D, which may be preserved at a temperature suitable for such purpose by cooling applications to the exterior surface thereof, or to the interior, being made hollow with this view.

The periphery of the mold may contain one or more sets of channels and matrices, and the receptacle be so constructed as to supply such additional sets, and I am not to be understood as limiting myself to any number of either.

What I claim as my invention, and desire to secure by Letters Patent, is—

1. The combination and arrangement of the balance-wheel A, geared wheels B and C, and mold D, substantially as set forth.

2. The combination and arrangement of the receptacle E and cooler-mold D, or their equivalents.

3. The combination of the receptacle E, bar h, joint f, uprights m and n, arranged in the manner and for the purpose described.

EDWARD M. LANG.

Witnesses:
WILLAM H. CLIFFORD,
HENRY C. HOUSTON.